US012277047B2

(12) United States Patent
Ghessassi (10) Patent No.: US 12,277,047 B2
(45) Date of Patent: Apr. 15, 2025

(54) SCALABLE REAL-TIME ANOMALY DETECTION

(71) Applicant: Charter Communications Operating, LLC, St. Louis, MO (US)

(72) Inventor: Karim Ghessassi, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 78 days.

(21) Appl. No.: 17/465,383

(22) Filed: Sep. 2, 2021

(65) Prior Publication Data
US 2023/0063814 A1 Mar. 2, 2023

(51) Int. Cl.
*G06F 11/30* (2006.01)
*G06F 9/54* (2006.01)

(52) U.S. Cl.
CPC .......... *G06F 11/3086* (2013.01); *G06F 9/542* (2013.01); *G06F 11/3006* (2013.01); *G06F 11/3079* (2013.01); *G06F 2201/81* (2013.01); *G06F 2201/86* (2013.01)

(58) Field of Classification Search
CPC .. G06F 11/30; G06F 11/3086; G06F 11/3006; G06F 11/3079; G06F 2201/81; G06F 2201/86
See application file for complete search history.

(56) References Cited

U.S. PATENT DOCUMENTS

| | | | | |
|---|---|---|---|---|
| 7,191,364 B2 * | 3/2007 | Hudson | ................. | G06F 11/366 717/124 |
| 7,475,387 B2 * | 1/2009 | Chandane | ........... | G06F 11/3612 717/126 |
| 7,509,539 B1 * | 3/2009 | Denefleh | ................ | G06F 11/079 714/48 |
| 8,565,323 B1 * | 10/2013 | McCuller | ............ | H04N 21/835 348/425.2 |
| 2006/0288261 A1 * | 12/2006 | Yuan | ................... | G06F 11/0715 714/48 |
| 2007/0061623 A1 * | 3/2007 | Yuan | ..................... | G06F 11/079 714/E11.026 |

(Continued)

OTHER PUBLICATIONS

Thudumu, Srikanth, et al., "A Comprehensive Survey of Anomaly Detection Techniques for High Dimensional Big Data", J Big Data 7, 42 (2020), https://doi.org/10.1186/s40537-020-00320-x, Jul. 2, 2020, 30 pages.

(Continued)

*Primary Examiner* — Kamini B Patel
(74) *Attorney, Agent, or Firm* — Dority & Manning, P.A.

(57) ABSTRACT

A central computer system receives a first plurality of event records, each event record identifying one or more events that have occurred in a device of a plurality of different devices. The central computer system identifies, from the first plurality of event records, a first group of event records that identify a same first set of one or more events that occurred on a first subset of the devices. The central computer system determines that a total number of the event records in the first group of event records exceeds a first threshold criterion. In response to determining that the total number of the event records in the first group of event records exceeds the first threshold criterion, the central computer system sends to a destination, information about the first set of one or more events.

22 Claims, 7 Drawing Sheets

(56) References Cited

U.S. PATENT DOCUMENTS

| | | | |
|---|---|---|---|
| 2008/0126878 A1* | 5/2008 | Best | G06F 11/3636 |
| | | | 714/E11.181 |
| 2009/0044053 A1* | 2/2009 | Chandane | G06F 11/3612 |
| | | | 714/25 |
| 2010/0185903 A1* | 7/2010 | Horn | G06F 11/004 |
| | | | 706/47 |
| 2012/0144251 A1* | 6/2012 | Carey | G06F 11/327 |
| | | | 714/57 |
| 2014/0149806 A1 | 5/2014 | Khalastchi et al. | |
| 2015/0256822 A1* | 9/2015 | Gao | H04N 19/00 |
| | | | 348/192 |
| 2016/0371600 A1* | 12/2016 | Svensen | G06N 7/01 |
| 2017/0139762 A1* | 5/2017 | Sherlock | G09B 7/00 |
| 2017/0153936 A1* | 6/2017 | Vorganti | G06F 11/079 |
| 2018/0160153 A1* | 6/2018 | Rajewski | H04N 21/4185 |
| 2019/0190942 A1* | 6/2019 | Drummond | H04L 43/16 |
| 2019/0354629 A1* | 11/2019 | Zavesky | G06F 16/285 |
| 2022/0156247 A1* | 5/2022 | Gururaj | G06F 16/1734 |
| 2022/0319239 A1* | 10/2022 | Bruce | G06F 11/3013 |

OTHER PUBLICATIONS

Hayes, Michael, et al., "Contextual Anomaly Detection in Big Sensor Data", in Proc. of the 3rd Int. Congress on Big Data (IEEE BigData 2014), Jun. 27-Jul. 2, 2014, 9 pages.

* cited by examiner

SCALABLE REAL-TIME ANOMALY DETECTION

BACKGROUND

An anomaly constitutes a deviation from a norm. In the context of electronic devices, anomalies often indicate a problem, or an imminent problem. Identifying anomalies can lead to faster problem resolution, increased customer satisfaction, and depending on the context, increased safety and other advantages.

SUMMARY

The embodiments disclosed herein implement scalable real-time anomaly detection. The embodiments include a central computer system that receives event records, each of which identifies a set of one or more events that has occurred on a particular device of a plurality of devices and that has been determined, by a sending client computing device, to be an abnormal set of events. Thus, the central computer system only receives events that are deemed abnormal, greatly reducing the quantity of events that the central computer system must process, reducing network usage, and reducing storage requirements.

In one embodiment a method is provided. The method includes receiving, by a central computer system comprising one or more processor devices of one or more computing devices, a first plurality of event records, each event record identifying one or more events that have occurred in a device of a plurality of different devices. The method further includes identifying, by the central computer system from the first plurality of event records, a first group of event records that identify a same first set of one or more events that occurred on a first subset of the devices. The method further includes determining, by the central computer system, that a total number of the event records in the first group of event records exceeds a first threshold criterion. The method further includes, in response to determining that the total number of the event records in the first group of event records exceeds the first threshold criterion, sending, to a destination, information about the first set of one or more events.

In another embodiment a computer system is provided. The computer system includes one or more computing devices comprising one or more processor devices, the one or more processor devices configured to receive a first plurality of event records, each event record identifying one or more events that have occurred in a device of a plurality of different devices. The one or more processor devices are further configured to identify, from the first plurality of event records, a first group of event records that identify a same first set of one or more events that occurred on a first subset of the devices. The one or more processor devices are further configured to determine that a total number of the event records in the first group of event records exceeds a first threshold criterion. The one or more processor devices are further configured to, in response to determining that the total number of the event records in the first group of event records exceeds the first threshold criterion, send, to a destination, information about the first set of one or more events.

In another embodiment a non-transitory computer-readable storage medium is provided. The non-transitory computer-readable storage medium includes executable instructions configured to cause a computer system that comprises one or more computing devices that include one or more processor devices to receive a first plurality of event records, each event record identifying one or more events that have occurred in a device of a plurality of different devices. The instructions are further configured to cause the one or more processor devices to identify, from the first plurality of event records, a first group of event records that identify a same first set of one or more events that occurred on a first subset of the devices. The instructions are further configured to cause the one or more processor devices to determine that a total number of the event records in the first group of event records exceeds a first threshold criterion. The instructions are further configured to cause the one or more processor devices to, in response to determining that the total number of the event records in the first group of event records exceeds the first threshold criterion, send, to a destination, information about the first set of one or more events.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

An anomaly constitutes a deviation from a norm. In the context of electronic devices, anomalies often indicate a problem, or an imminent problem. Identifying anomalies can lead to faster problem resolution, increased customer satisfaction, and depending on the context, increased safety and other advantages.

An entity that owns, operates, or is otherwise responsible for the operation of a group of devices may be interested in anomalies that occur in the group of devices. For example, an airline company may be interested in anomalies that occur in a fleet of 747 aircraft, or an automobile manufacturer may be interested in anomalies that occur in a set of manufacturing robots, or a streaming video company may be interested in anomalies that occur during the streaming of videos provided by the company. Often, an anomaly is only identifiable in the context of a set of events. Each individual event by itself may be normal; however, in the context of one or more events that preceded the event, or succeeded the event, the set of events may be anomalous. However, not all abnormal sets of events are of interest, since, for example, human behavior may generate a unique set of events that is not indicative of a problem.

Sometimes devices send all events to a central computing device for the purpose of anomaly detection. The central computing device attempts to recreate sequences of events, generally for each individual device. Algorithms are run to attempt to determine anomalous events. This can take a substantial amount of processing time, require substantial amounts of storage, and may make real-time anomaly detection impracticable or impossible.

The embodiments disclosed herein implement scalable real-time anomaly detection. The embodiments include a central computer system that receives event records, each of which identifies a set of events that has occurred on a particular device of a plurality of devices and that has been determined, by a sending client computing device, to be an abnormal set of events. Thus, the central computer system only receives events that are deemed abnormal, greatly reducing the quantity of events that the central computer system must process, reducing network usage, and reducing storage requirements. The central computer system maintains a sum of identical event records that identify a same set of events. Based on the sum of the event records, and one or more criterion, the central computer system may determine that the set of events in the event records constitutes an anomaly and, in response, sends information to a destination that indicates an anomaly has occurred.

Figure 1A:
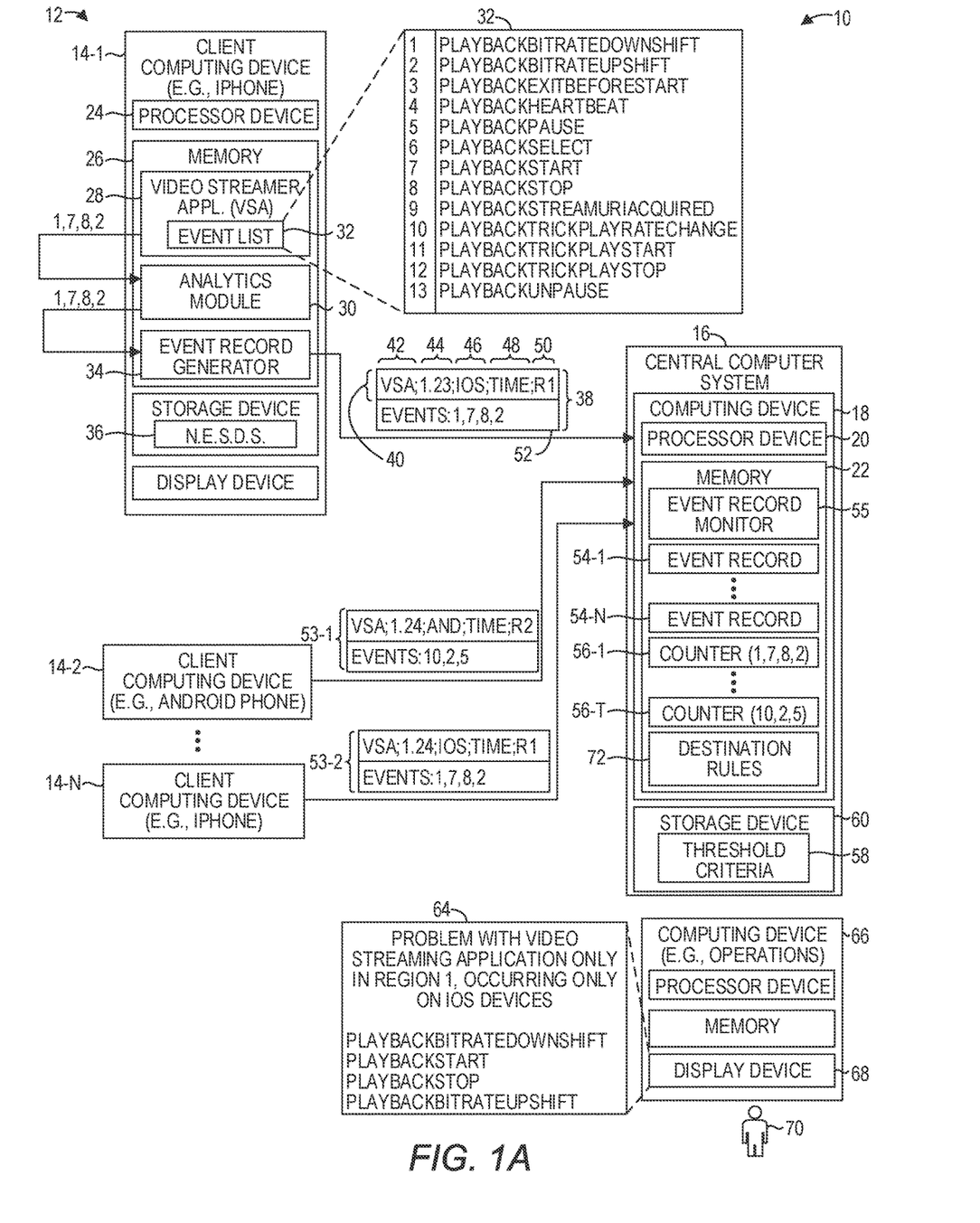
FIGS. 1A and 1B are block diagrams of an environment suitable for implementing scalable real-time anomaly detection according to one embodiment.

FIG. 1A is a block diagram of an environment 10 suitable for implementing scalable real-time anomaly detection according to one embodiment. The environment 10 includes a plurality of devices 12 on which events occur. In this example, the plurality of devices 12 include a plurality of client computing devices 14-1, 14-2-14-N (generally, client computing devices 14). Thus, in this embodiment, in contrast to additional embodiments discussed below with regard to FIG. 5, the devices 12 and the client computing devices 14 are the same devices. The term "client" in "client computing device" is used herein solely to easily distinguish the client computing devices 14 from other computing devices, and does not imply any particular characteristic or attributes of the client computing devices 14 other than as described herein. The client computing devices 14 may be any number of devices, such as ten, one hundred, one thousand, one million, or more.

The environment 10 also includes a central computer system 16 that includes one or more computing devices 18. Each of the one or more computing devices 18 includes one or more processor devices 20, and a memory 22. While, for the sake of simplicity, only one computing device 18 and one processor device 20 is illustrated, the functionality described herein with regard to the computing device 18 may be distributed across any number of computing devices 18 in the central computer system 16 and any number of processor devices 20 contained in such computing devices 18.

The client computing devices 14 continuously monitor events that occur on the respective client computing devices 14 and identify, from the events, event sets of one or more events. The client computing devices 14 determine whether an event set is a normal event set or an abnormal event set. If an event set is an abnormal event set, a client computing device 14 sends an event record to the central computer system 16. The central computer system 16 identifies groups of identical event sets received from the computing devices 18. If the quantity of event sets in a group of identical event sets meets a criterion, the central computer system 16 may send an alert to a destination indicating an anomaly.

With this background, an example of scalable real-time anomaly detection in the context of a video streaming application will now be discussed. The client computing device 14-1 includes one or more processor devices 24 and a memory 26. The client computing device 14-1 includes a video streaming application (VSA) 28 that is configured to stream videos from a video repository operated by an operator of the central computer system 16. The VSA 28 may be any video streaming application, including a proprietary video streaming application or a commercially available video streaming application, such as, by way of non-limiting example, YouTube®, Netflix®, HULU®, Amazon® Prime Video, or the like.

In this embodiment, the VSA 28 works in conjunction with software instrumentation software, in this example an analytics module 30, and provides event identifiers that identify video events (hereinafter "events" for the sake of brevity) that occur during a video streaming session as the events occur in the VSA 28. The events are predetermined events identified in an event list 32. In this example, there are thirteen predetermined events identified in the event list 32. The client computing device 14-1 also includes an event record generator 34 that obtains from the analytics module 30 the event identifiers that identify the events that have occurred in the VSA 28.

The event record generator 34 identifies, based on the event identifiers, event sets. In this example, the event record generator 34 identifies an event set that includes the event identifiers 1, 7, 8, and 2, which correspond, respectively, to the events PLAYBACKBITRATEDOWNSHIFT, PLAYBACKSTART, PLAYBACKSTOP, PLAYBACKBITRATEUPSHIFT as indicated by the event list 32. Mechanisms for determining event sets from a stream of events will be discussed below. The client computing device 14-1 includes, or has access to, a normal event set data structure (NESDS) 36, in this embodiment, a file, that comprises information that identifies a plurality of different sets of events that are deemed normal. The NESDS 36 may comprise any suitable format. In some implementations, the NESDS 36 may comprise a machine learned model that has been trained to identify abnormal event sets. In other implementations, the NESDS 36 may comprise a list of known normal event sets. The NESDS 36 may be generated in a central location, such as, by way of non-limiting example, by the central computer system 16, and provided to the client computing devices 14. Over time, the NESDS 36 may be periodically updated and resent to the client computing devices 14 to replace a previous version of the NESDS 36.

The event record generator 34 accesses the NESDS 36 to determine if the event set is deemed to be a normal event set. If not, the event record generator 34 deems the event set to be an abnormal event set and generates an event record 38 and sends the event record 38 to the central computer system 16. In this example, the event record 38 includes contextual information in a header 40. The header 40 includes metadata 42 that identifies the particular application, in this case the VSA 28, metadata 44 that identifies the version of the VSA 28, in this case the version 1.23, metadata 46 that identifies the operating system of the client computing device 14-1, in this case 10S, metadata 48 that identifies an approximate time that the events occurred, and metadata 50 that identifies a geographic region in which the client computing device 14-1 is located, in this case a geographic region R1, which may correspond, for example, to a particular state in a country, to a particular portion of a country, or to any other predetermined geographic area. The event record 38 also includes an event set field 52 that contains the event identifiers of the relevant event set and the order of occurrence of the events. In a case where the VSA 28 may execute on different platforms, such as a Roku® platform, a Chromecast™ platform, an Apple TV® platform, a Kindle Fire platform, and the like, the header 40 may also identify the particular platform.

In other implementations, rather than provide the contextual information in a header 40, the contextual information may be stored centrally, such as in a database. The contextual information may correspond to a unique identifier, such as a session identifier. The event record generator 34 may include the session identifier in the event record 38, and the central computer system 16 may utilize the session identifier to access the corresponding contextual information in the central database.

It is noted that this particular division of functionality between the VSA 28, the analytics module 30, and the event record generator 34 is only one mechanism for implementing the embodiments disclosed herein. For example, in other implementations, the event generating component, in this case the VSA 28, may have logic incorporated therein to identify event sets, determine if the event sets are abnormal event sets, and if so, generate and send a corresponding event record to the central computer system 16, and separate components, such as the analytics module 30 and the event record generator 34 are unnecessary. In other implementations, the functionality described with regard to the analytics module 30 and the event record generator 34 may be incorporated into a single component. In yet other implementations, the functionality described with regard to the analytics module 30 and the event record generator 34 may be incorporated into a number of components greater than two, such as three, four, or more components.

It is also noted that although for purposes of simplicity and explanation the event record generator 34 is illustrated as generating event records for events that occur in the VSA 28, in practice, the event record generator 34 may obtain events that occur in any number of components of the client computing device 14-1, such as operating system events, hardware device events, other software components that are not illustrated, and the like. The event record generator 34 may include information, such as the metadata 42, in each event record that identifies the particular component, and the central computer system 16 may process the event records of each different component independently of the event records of other components.

Although, due to space limitations, the client computing devices 14-2-14-N are illustrated in less detail than the client computing device 14-1, in practice, the client computing devices 14-2-14-N are configured substantially similarly to the client computing device 14-1 and operate similarly to send event records 53-1, 53-2 identifying abnormal event sets to the central computer system 16.

The central computer system 16 receives event records from the client computing devices 14 that contain event sets that the client computing devices 14 have deemed to be abnormal event sets based on the NESDS 36. In this example, the central computer system 16 has stored such event records as event records 54-1-54-N (generally, event records 54). An event record monitor 55 maintains counters and/or other metrics of the event records 54. For example, the event record monitor 55 may maintain separate event record counters 56-1-56-T (generally, event record counters 56) for each different set of events identified in the event records 54. As an example, the event record counter 56-1 may indicate that the event record monitor 55 has received a group of 1123 event records 54 that identify the set of events 1, 7, 8, 2, from a particular subset of the client computing devices 14, and the event record counter 56-T may indicate that the event record monitor 55 has received a group of 20 event records 54 that identify the set of events 10, 2, 5 from a particular subset of the client computing devices 14. In some embodiments, the event record counters 56 may be time based, such that the event record counters 56 are reset after a certain period of time, or only maintain a count of the event records 54 received over a particular period of time, such as the previous minute, previous five minutes, or the like. The event record monitor 55 may logically group event records 54 that identify the same set of events.

The event record monitor 55 continuously also monitors threshold criteria 58 which may be maintained, for example, on a storage device 60. The threshold criteria 58 identify the criteria for which the event record monitor 55 will generate and send information (sometimes referred to herein as an alert) regarding a particular set of events to a destination. The destination may include, by way of non-limiting example, one or more of a predetermined computing device, a display device, a predetermined email address, a telephone number, or the like. The threshold criteria 58 help eliminate the generation of alerts for transient sets of abnormal sets of events that may occur even in the absence of a problem that needs to be resolved. For example, a user of a client computing device 14 may enter an unusual sequence of play, rewind, and forward commands into the VSA 28 that results in the generation of an event record because such set of events is not identified as a normal set of events in the NESDS 36, but there is no need to generate an alert because the abnormal set of events was completely user driven and does not indicate a problem with the VSA 28 or the network between the client computing device 14-1 and the central streaming server. As another example, a temporary streaming problem in the central streaming server that quickly self-corrects may result in a relatively small number of abnormal event sets in a number of the client computing devices 14, which in turn results in a number of event records identifying such abnormal event sets being sent to the central computer system 16. However, there is no need for an alert because the issue was transient and self-corrected.

The threshold criteria 58 may be a single criterion or may be multiple criteria. For example, the threshold criteria 58 may indicate that if the total number of event records 54 that identify a same set of events is greater than some predetermined number, such as 100, then an alert should be generated and sent to a destination. As another example, the threshold criteria 58 may indicate that if the ratio of event records 54 received from client computing devices 14 exceeds a certain threshold, then an alert should be generated and sent to a destination. For example, if the same set of events has occurred on 10% of the client computing devices 14, an alert should be generated and sent to a destination.

The threshold criteria 58 may include one or more items of metadata 42, 44, 46, 48, and 50 contained in the event records 54. For example, the threshold criteria may indicate that if the total number of event records 54 that identify a same set of events is greater than 400, or, if the total number of event records 54 is greater than 200 and the event records 54 identify events that originated in client computing devices 14 in the same geographic region (as indicated in the metadata 50), an alert should be generated and sent to a destination.

In this example, assume for purposes of illustration that the total number of event records 54 that identify the set of events 1, 7, 8, 2 exceed a threshold criterion identified in the threshold criteria 58. The event record monitor 55 may analyze the relevant event records 54 and identify certain characteristics of such event records 54. In this example, the event record monitor 55 determines that each event record 54 identifies a set of events that originated on an IOS device that is located in region R1. The event record monitor 55 generates information 64 that indicates that a set of the video streaming applications that execute on IOS devices in region R1 have had an identical set of events that are deemed abnormal. The information 64 also identifies the set of events in the order in which the events occurred. The event record monitor 55 sends the information 64 to a destination, in this case an operations computing device 66. The operations computing device 66 presents the information 64 on a display device 68 for viewing by an operator 70.

In some implementations, the event record monitor 55 may access predetermined destination rules 72 to determine the appropriate destination or destinations to which the information 64 is to be sent. The destination rules 72, for example, may correlate a particular platform to a particular destination. The destination rules 72 may indicate, for example, that a problem that is solely occurring on IOS devices is to be sent to one destination, such as an engineer responsible for IOS devices, and a problem that is solely occurring on Android devices is to be sent to another destination, such as an engineer responsible for Android devices. The destination rules 72 may indicate that a problem that is occurring solely in one region is to be sent to an operator responsible for that region.

As another example, assume that at the time illustrated in FIG. 1A, the event record monitor 55 determines that the counter 56-T has a value of 40, indicating that the event record monitor 55 has received 40 event records 54 that contain the set of events 10, 2, and 5. The event record monitor 55 accesses the threshold criteria 58 and determines that no alert is to be generated unless the quantity of event records 54 that identify the same set of events exceeds 100.

Figure 1B:
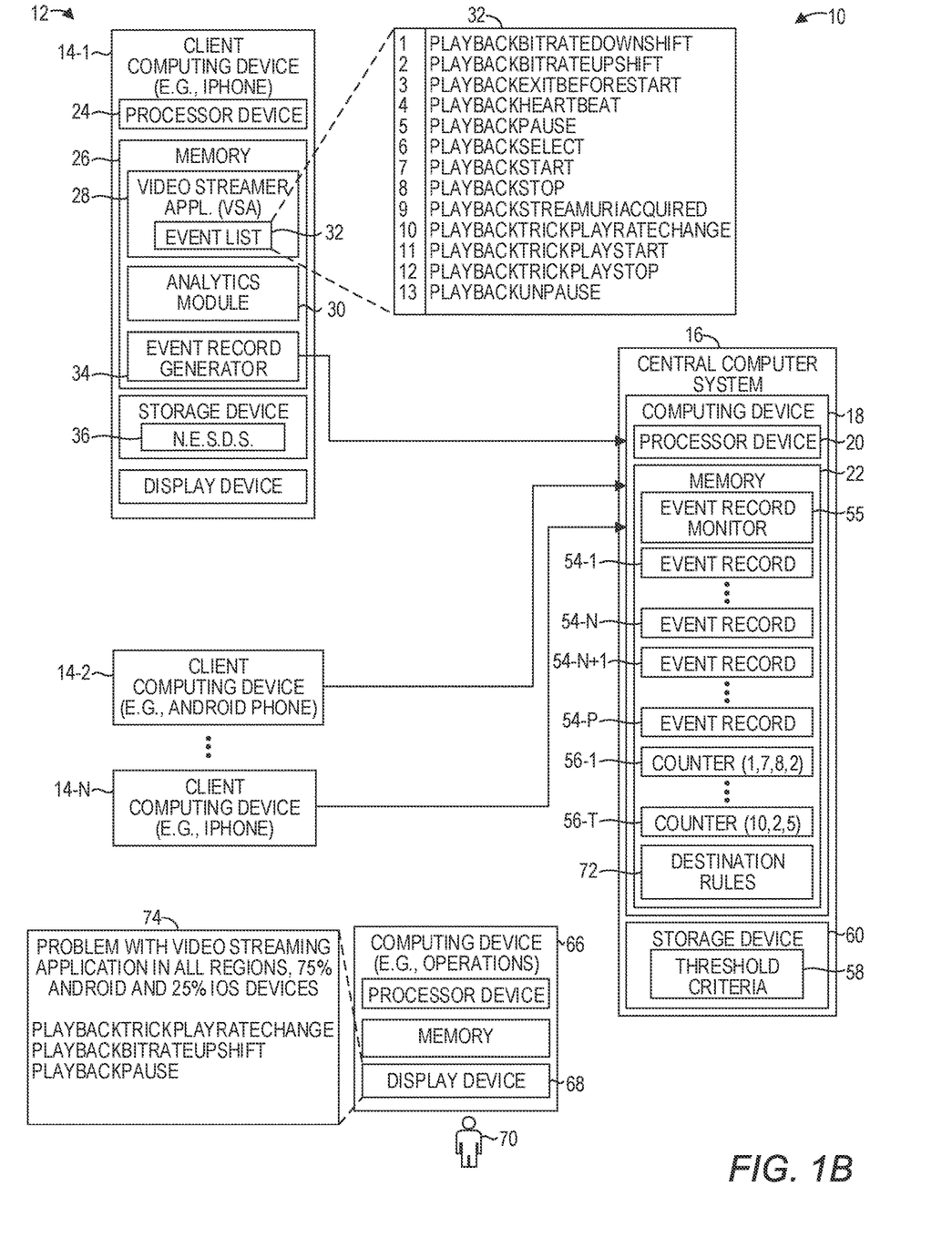

Referring now to FIG. 1B, at a later point in time, the event record monitor 55 receives another plurality of event records 54-N+1 to 54-P. The event record monitor 55 determines that a subset of the event records 54-N+1 to 54-P identify the set of events 10, 2, and 5. At some point in time, the event record monitor 55 processes one of the event records 54-N+1 to 54-P, determines that the event record 54 identifies the set of events 10, 2, and 5, and increments the counter 56-T. The event record monitor 55 determines that the counter 56-T now has a value of 101. The event record monitor 55 accesses the threshold criteria 58 and determines that an alert should be generated and sent to a destination. The event record monitor 55 analyzes the relevant event records 54 and identifies certain characteristics of such event records 54. In this example, the event record monitor 55 determines that event records 54 that identify the set of events have originated in all regions. In this example, the event record monitor 55 is also configured to indicate the percentages of the event records 54 received on two different platforms, the IOS platform and the Android platform.

The event record monitor 55 generates information 74 that indicates that a set of the video streaming applications that execute in all regions have had an identical set of events that are deemed abnormal, that 75% of the event records that identify the set of events have originated from Android devices, and that 25% of the event records have originated from IOS devices. The information 74 also identifies the set of events in the order in which the events occurred. The event record monitor 55 sends the information 74 to a destination, in this case the operations computing device 66. The operations computing device 66 presents the information 74 on the display device 68 for viewing by the operator 70.

It is noted that, because the event record monitor 55 is a component of the computing device 18, functionality implemented by the event record monitor 55 may be attributed to the computing device 18 generally. Moreover, in examples where the event record monitor 55 comprises software instructions that program the processor device 20 to carry out functionality discussed herein, functionality implemented by the event record monitor 55 may be attributed herein to the processor device 20. In implementations where the central computer system 16 includes a plurality of computing devices, each of which may include one or more processor devices, the functionality described herein may be attributed to one or more of such processor devices on one or more of such computing devices.

Figure 2:
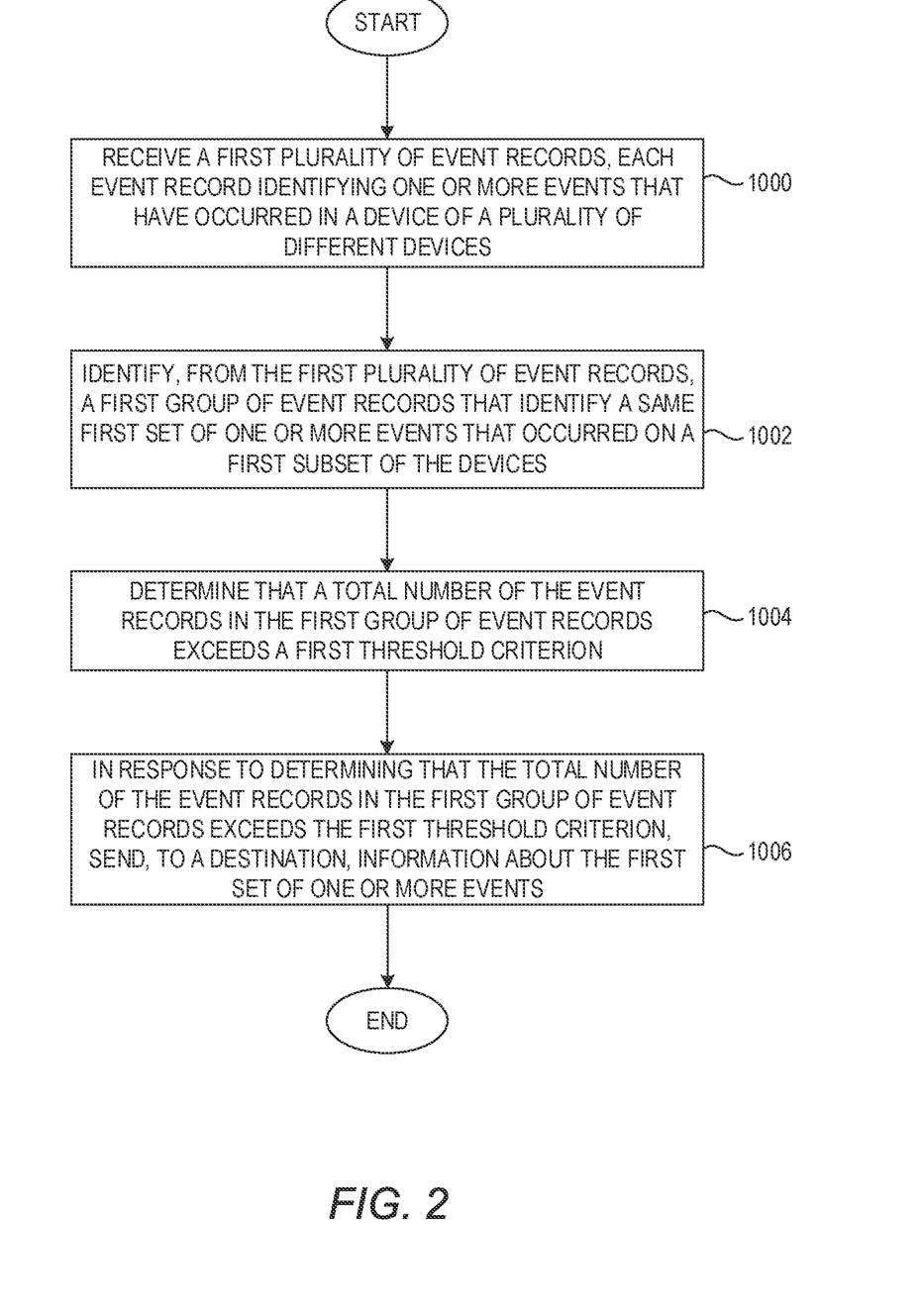
FIG. 2 is a flowchart of a method for implementing scalable real-time anomaly detection according to one embodiment.

FIG. 2 is a flowchart of a method for implementing scalable real-time anomaly detection according to one embodiment. FIG. 2 will be discussed in conjunction with FIGS. 1A-1B. The central computer system 16 receives the plurality of event records 54, each event record 54 identifying one or more events that have occurred in a device 12, such as, in this example, a client computing device 14 of the plurality of different client computing devices 14 (FIG. 2, block 1000). The central computer system 16 identifies, from the plurality of event records 54, a group of event records 54 that identify a same set of one or more events that occurred on a subset of the devices 14 (FIG. 2, block 1002). The central computer system 16 determines that a total number of the event records 54 in the group of event records 54 exceeds a threshold criterion (FIG. 2, block 1004). In response to determining that the total number of the event records 54 in the group of event records 54 exceeds the threshold criterion, the central computer system 16 sends, to a destination such as the operations computing device 66, the information 64 about the set of one or more events (FIG. 2, block 1006).

Figure 3:
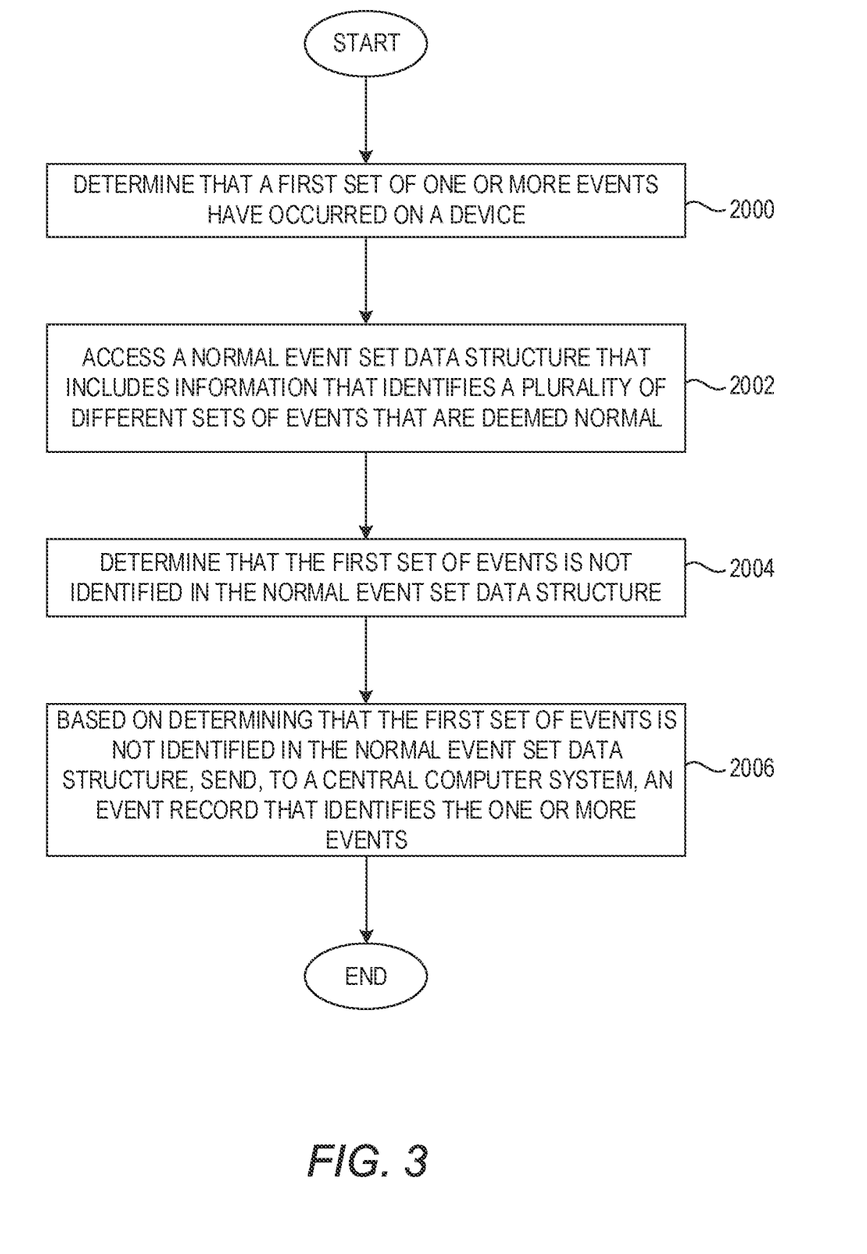
FIG. 3 is a flowchart of a method for implementing scalable real-time anomaly detection from the perspective of a client computing device according to one embodiment.

FIG. 3 is a flowchart of a method for implementing scalable real-time anomaly detection from the perspective of the client computing device 14-1 according to one embodiment. FIG. 3 will be discussed in conjunction with FIGS. 1A-1B. The client computing device 14-1 determines that a first set of one or more events have occurred on a device 12, which, in this embodiment, is the client computing device 14-1 (FIG. 3, block 2000). The client computing device 14-1 accesses the NESDS 36 that includes information that identifies a plurality of different sets of events that are deemed normal (FIG. 3, block 2002). The client computing device 14-1 determines that the first set of events is not identified in the NESDS 36 (FIG. 3, block 2004). The client computing device 14-1, based on determining that the first set of events is not identified in the NESDS 36, sends, to the central computer system 16, the event record 38 that identifies the one or more events (FIG. 3, block 2006).

Figure 4:
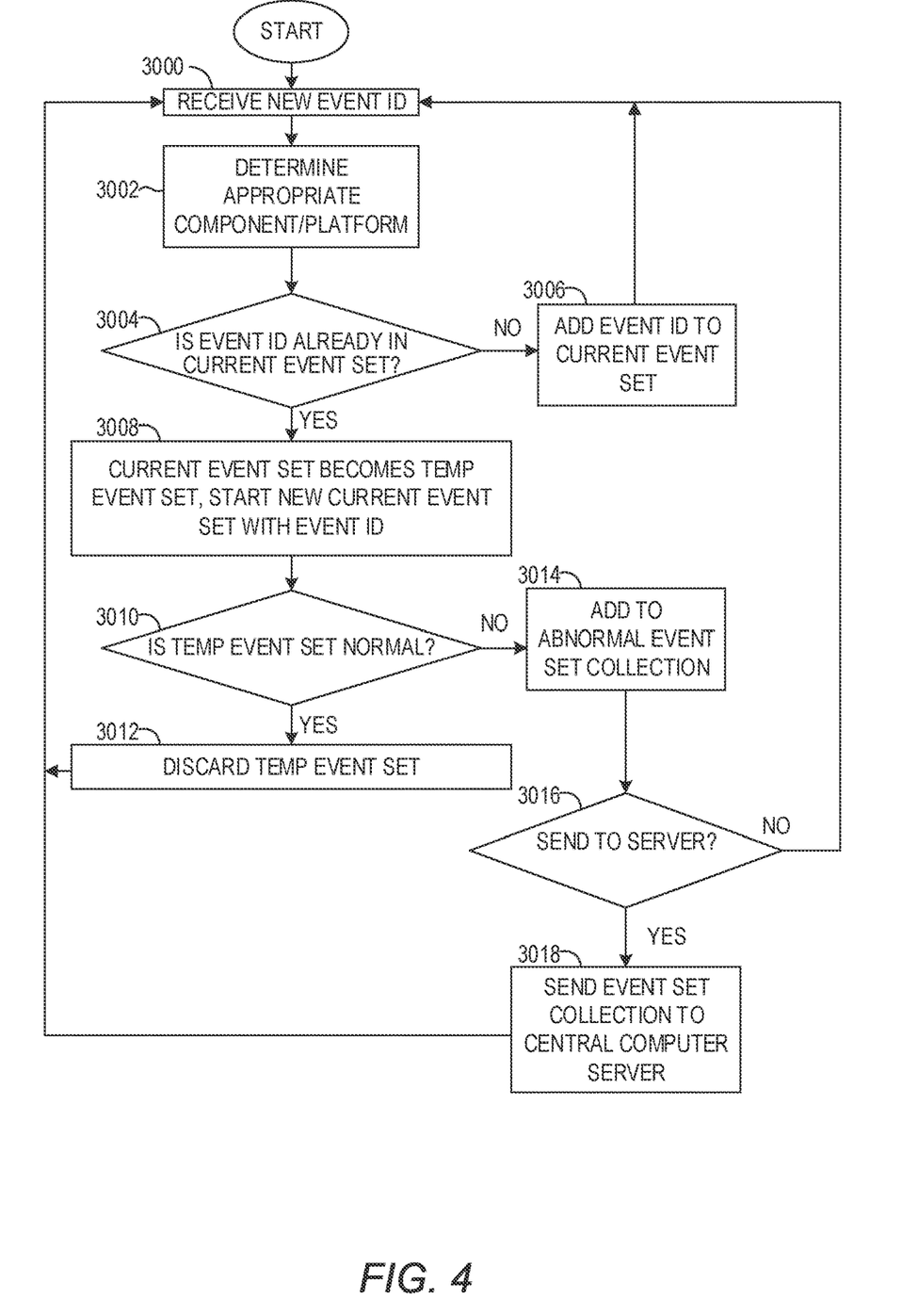
FIG. 4 is a flowchart of a method for identifying sets of events according to one embodiment.

FIG. 4 is a flowchart of a method for identifying sets of events. FIG. 4 will be discussed in conjunction with FIG. 1A. For purposes of illustration, assume that the VSA 28 generates a PLAYBACKBITRATEDOWNSHIFT event (event ID 1). The VSA 28 sends an event ID 1 to the analytics module 30. The event record generator 34 receives the event ID 1 from the analytics module 30 (FIG. 4, block 3000). The event record generator 34 determines the appropriate platform or component with which the event ID is associated (FIG. 4, block 3002). This step is optional if the event record generator 34 is processing events for only a single component or platform, such as is the case in FIG. 1A. Where the event record generator 34 is processing events for multiple components or platforms, the event record generator 34 maintains separate event sets for each such component or platform.

The event record generator 34 determines if the event ID 1 is already in the current event set (FIG. 4, block 3004). In this example, the event ID 1 is the first event received by the event record generator 34, and thus the current event set is empty. The event record generator 34 adds the event ID 1 to the current event set, and thus the current event set has a membership of [1] (FIG. 4, block 3006). Processing returns to block 3000.

The VSA 28 generates a PLAYBACKSTART (event ID 7). The event record generator 34 receives the event ID 7 from the analytics module 30 (FIG. 4, block 3000). The event record generator 34 determines the appropriate platform or component with which the event ID is associated (FIG. 4, block 3002). The event record generator 34 determines that the event ID 7 is not in the current event set (FIG. 4, block 3004). The event record generator 34 adds the event ID 7 to the current event set, and thus the current event set has a membership of [1,7] (FIG. 4, block 3006). Processing returns to block 3000.

The VSA 28 generates a PLAYBACKSTOP (event ID 8). The event record generator 34 receives the event ID 8 from the analytics module 30 (FIG. 4, block 3000). The event record generator 34 determines the appropriate platform or component with which the event ID is associated (FIG. 4, block 3002). The event record generator 34 determines that the event ID 8 is not in the current event set (FIG. 4, block 3004). The event record generator 34 adds the event ID 8 to the current event set, and thus the current event set has a membership of [1,7,8] (FIG. 4, block 3006). Processing returns to block 3000.

The VSA 28 generates a PLAYBACKBITRATEUPSHIFT event (event ID 2). The event record generator 34 receives the event ID 2 from the analytics module 30 (FIG. 4, block 3000). The event record generator 34 determines the appropriate platform or component with which the event ID is associated (FIG. 4, block 3002). The event record generator 34 determines that the event ID 2 is not in the current event set (FIG. 4, block 3004). The event record generator 34 adds the event ID 2 to the current event set, and thus the current event set has a membership of [1,7,8,2] (FIG. 4, block 3006). Processing returns to block 3000.

The VSA 28 generates a PLAYBACKBITRATEDOWNSHIFT event (event ID 1). The event record generator 34 receives the event ID 1 from the analytics module 30 (FIG. 4, block 3000). The event record generator 34 determines the appropriate platform or component with which the event ID is associated (FIG. 4, block 3002). The event record generator 34 determines that the event ID 1 is in the current event set (FIG. 4, block 3004). In this embodiment, a recurrence of an event that is already in the current event set is the trigger to start a new event set and finalize membership of the current event set. The event record generator 34 makes the current event set a temporary event set having a membership of [1,7,8,2], and starts a new current event set that has a membership of [1] (FIG. 4, block 3008).

The event record generator 34 accesses the NESDS 36 to determine whether the temporary event set is a normal event set or an abnormal event set (FIG. 4, block 3010). If the temporary event set is identified as a normal event set, then the event record generator 34 discards the temporary event set and processing returns to block 3000 (FIG. 4, block 3012).

If the temporary event set is identified as an abnormal event set, then the event record generator 34 generates an event record that identifies the event set and contextual information relating to the event set as discussed above with regard to FIGS. 1A and 1B. In other embodiments, the event record generator 34 may immediately send the event record to the central computer system 16. In other embodiments, rather than send individual event records, the event record generator 34 may only send event records to the central computer system 16 periodically. Among other advantages, delaying the sending of event records to the central computer system 16 for a period of time, such as 500 milliseconds, one second, five seconds, or any other desirable period of time, may reduce the amount of data sent, thereby reducing network bandwidth usage. For example, if the event record identifies a set of events that have occurred successively multiple times, such as ten times, the event record generator 34 need only send the event record once but indicate that the event set has occurred ten times.

In this embodiment, the event record generator 34 generates an event record and stores the event record in a collection of event records (FIG. 4, block 3014). The event record generator 34 determines whether the collection of event records should be sent to the central computer system 16 (FIG. 4, block 3016). For example, the event record generator 34 may determine if a predetermined period of time has passed since event record generator 34 last sent event records to the central computer system 16. If so, the event record generator 34 sends the collection of event records to the central computer system 16 (FIG. 4, block 3018). Processing then continues at block 3000. If the collection of event records is not ready to be sent to the central computer system 16, processing continues at block 3000.

Figure 5:
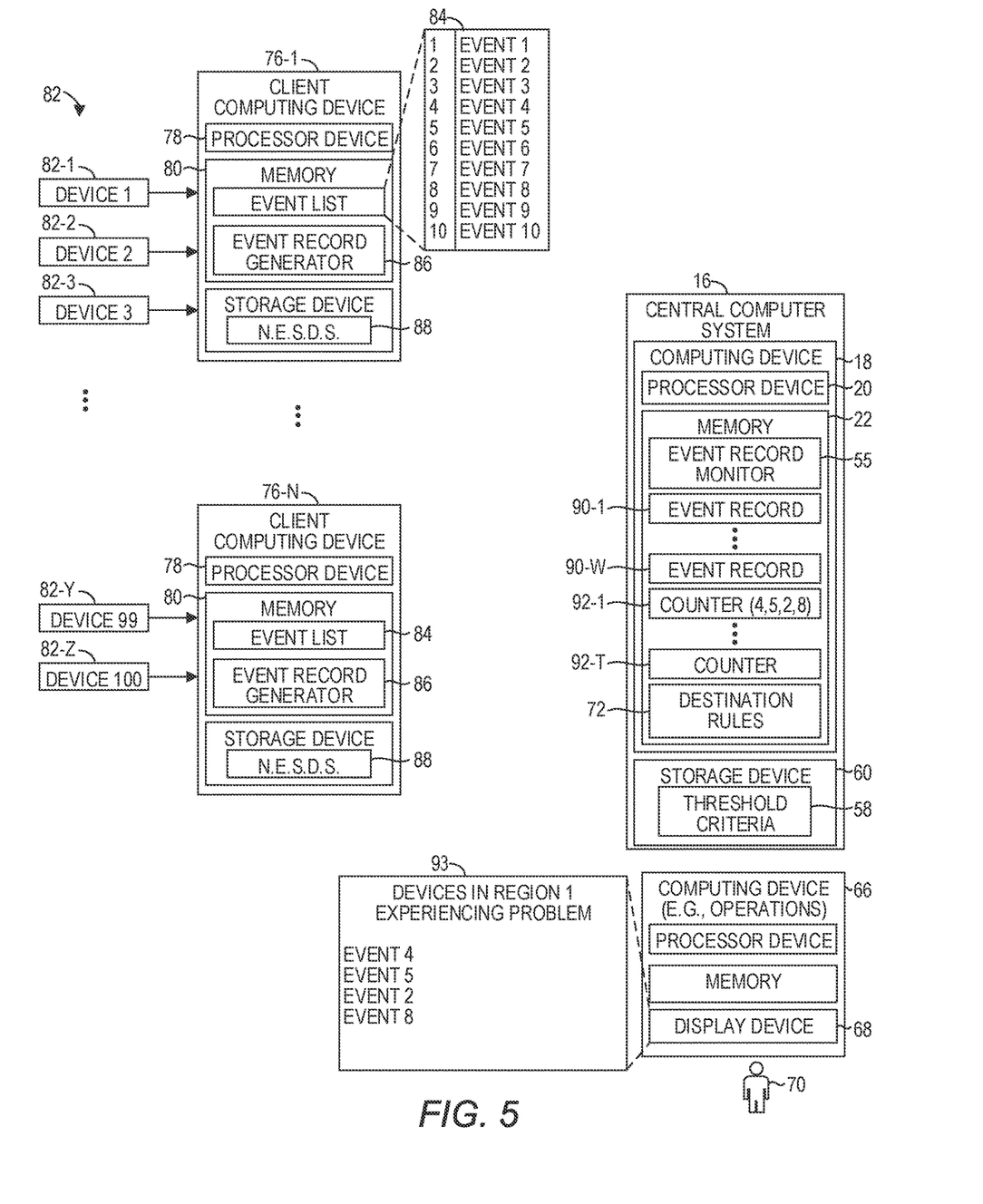
FIG. 5 is a block diagram of an environment suitable for implementing scalable real-time anomaly detection according to another embodiment.

FIG. 5 is a block diagram of an environment 10-1 according to another embodiment. The environment 10-1 is substantially similar to the environment 10, except as otherwise noted herein. The environment 10-1 includes the central computer system 16, and a plurality of client computing devices 76-1-76-N (generally client computing devices 76), each of which has a processor device 78 and a memory 80. There may be tens, hundreds or thousands of client computing devices 76. Each of the client computing devices 76 is communicatively coupled to one or more devices 82. In this example, the client computing device 76-1 is communicatively coupled to devices 82-1-82-3, and the client computing device 76-N is communicatively coupled to devices 82-Y and 82-Z. The devices 82 may communicate with a particular client computing device 76 via a direct cable communications path, a wireless communications path, or via one or more networks.

In this embodiment, events occur on the devices 82 and are sent to a corresponding client computing device 76. The devices 82 may comprise any device capable of identifying events that occur on the devices, including, by way of non-limiting example, sensors, airplanes, car components, or the like. The client computing devices 76 may include event lists 84 that identify the events. The client computing devices 76 also include event record generators 86 that operate substantially similarly to the event record generator 34 discussed with regard to FIGS. 1A-1B. In particular, the event record generators 86 receive events from corresponding devices 82, access a normal event set data structure (NESDS) 88, and determine whether event sets received from the devices 82 are normal or abnormal. If the event record generator 86 deems the event set to be an abnormal event set, the event record generator 86 generates an event record and sends the event record to the central computer system 16. The event record may include contextual information, such as the particular device 82 on which the events occurred, a version of the device 82, and operating system of the device 82, an approximate time that the events occurred, and information that identifies a geographic region in which the device 82.

The central computer system 16 receives event records from the client computing devices 76 that contain event sets that the client computing devices 76 have deemed to be abnormal event sets based on the NESDS 88. The central computer system 16 stores such event records as event records 90-1-90-W (generally, event records 90). The event record monitor 55 maintains counters 92-1-92-T and/or other metrics of the event records 90, and continuously monitors the threshold criteria 58. In this example, based on a quantity of the event records 90 that contain an event set that identifies the events 4, 5, 2, and 8, and the threshold criteria 58, the event record monitor 55 generates information 93, which indicates that devices 82 in region 1 are experiencing a problem. The event record monitor 55 sends the information 93 to a destination, in this case the operations computing device 66. The operations computing device 66 presents the information 93 on the display device 68 for viewing by the operator 70.

Figure 6:
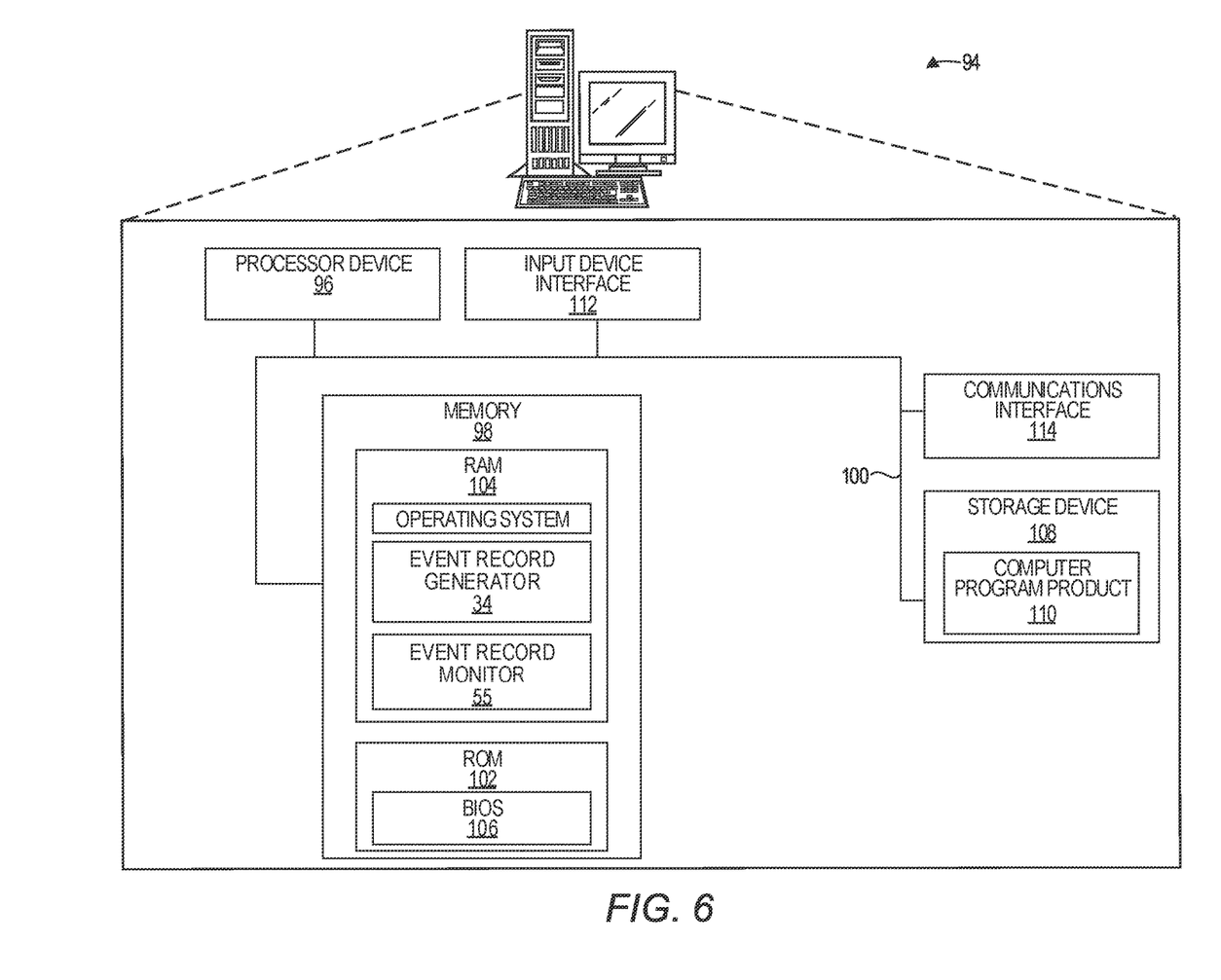
FIG. 6 is a block diagram of a computing device suitable for implementing computing devices disclosed herein.

FIG. 6 is a block diagram of a computing device 94 suitable for implementing either one of more of the computing devices 18 in the central computer system 16, or a client computing device 14. The computing device 94 may comprise any computing or electronic device capable of including firmware, hardware, and/or executing software instructions to implement the functionality described herein, such as a computer server, a desktop computing device, a laptop computing device, or the like. The computing device 94 includes a processor device 96, a system memory 98, and a system bus 100. The system bus 100 provides an interface for system components including, but not limited to, the system memory 98 and the processor device 96. The processor device 96 can be any commercially available or proprietary processor.

The system bus 100 may be any of several types of bus structures that may further interconnect to a memory bus (with or without a memory controller), a peripheral bus, and/or a local bus using any of a variety of commercially available bus architectures. The system memory 98 may include non-volatile memory 102 (e.g., read-only memory (ROM), erasable programmable read-only memory (EPROM), electrically erasable programmable read-only memory (EEPROM), etc.), and volatile memory 104 (e.g., random-access memory (RAM)). A basic input/output system (BIOS) 106 may be stored in the non-volatile memory 102 and can include the basic routines that help to transfer information between elements within the computing device 94. The volatile memory 104 may also include a high-speed RAM, such as static RAM, for caching data.

The computing device 94 may further include or be coupled to a non-transitory computer-readable storage medium such as a storage device 108, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like.

A number of modules can be stored in the storage device 108 and in the volatile memory 104, including an operating system and one or more program modules, such as the event record generator 34 when implementing a client computing device 14, or an event record monitor 55 when implementing a computing device 18.

All or a portion of the examples may be implemented as a computer program product 110 stored on a transitory or non-transitory computer-usable or computer-readable storage medium, such as the storage device 108, which includes complex programming instructions, such as complex computer-readable program code, to cause the processor device 96 to carry out the steps described herein. Thus, the computer-readable program code can comprise software instructions for implementing the functionality of the examples described herein when executed on the processor device 96.

An operator may also be able to enter one or more configuration commands through a keyboard (not illustrated), a pointing device such as a mouse (not illustrated), or a touch-sensitive surface such as a display device. Such input devices may be connected to the processor device 96 through an input device interface 112 that is coupled to the system bus 100 but can be connected by other interfaces such as a parallel port, an Institute of Electrical and Electronic Engineers (IEEE) 1394 serial port, a Universal Serial Bus (USB) port, an IR interface, and the like. The computing device 94 may also include a communications interface 114 suitable for communicating with a network as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
  generating, by a central computer system comprising one or more processor devices of one or more computing devices, a normal event set data structure, the normal event set data structure comprising information that identifies a plurality of different sets of events that are deemed normal;

sending, by the central computer system, the normal event set data structure to a plurality of different devices on which the sets of events can occur to identify to the different devices sets of events not to be sent to the central computer system;

receiving, by the central computer system from the plurality of different devices, a first plurality of event records, each event record identifying one or more events that have occurred on a device of the plurality of different devices, the first plurality of event records comprising only sets of events not identified in the normal event set data structure;

identifying, by the central computer system from the first plurality of event records, a first group of event records that identify a same first set of a plurality of events that occurred on a first subset of at least two of the different devices;

determining, by the central computer system, that a total number of the event records in the first group of event records exceeds a first threshold criterion; and in response to determining that the total number of the event records in the first group of event records exceeds the first threshold criterion, sending, to a destination, information about the first set of the plurality of events.

2. The method of claim 1 wherein each event record of the first plurality of event records that identifies more than one event identifies an order of occurrence of the events identified in the event record.

3. The method of claim 1 wherein the information about the first set of the plurality of events includes information identifying an order of occurrence of the plurality of events.

4. The method of claim 1 further comprising:
identifying, from the first plurality of event records, a second group of event records that identify a same second set of a plurality of events that occurred on a second subset of at least two of the devices, the events identified in the second set of the plurality of events being different from the events identified in the first set of the plurality of events;
determining that a total number of the event records in the second group of event records is less than a second threshold criterion; and
in response to determining that the total number of the event records in the second group of event records is less than the second threshold criterion, inhibiting sending, to the destination, information about the second set of the plurality of events.

5. The method of claim 4 further comprising:
subsequent to receiving the first plurality of event records, receiving, by the central computer system, a second plurality of event records, each event record in the second plurality of event records identifying one or more events that have occurred in a device of the plurality of different devices;
identifying, from the second plurality of event records, a third group of event records that identify the same second set of one or more events that occurred on a third subset of the devices;
determining that a total number of the event records in the second group of event records and the third group of event records exceeds the second threshold criterion; and
in response to determining that the total number of the event records in the second group of event records and the third group of event records exceeds the second threshold criterion, sending, to the destination, information about the second set of one or more events.

6. The method of claim 1 wherein each device of the plurality of different devices corresponds to a particular platform of a plurality of different platforms, and wherein each event record in the first group of event records corresponds to a same platform.

7. The method of claim 6 wherein the plurality of different platforms comprises a plurality of different operating systems.

8. The method of claim 6 wherein the plurality of different platforms comprises a plurality of different video streaming applications.

9. The method of claim 6 further comprising:
accessing destination rules that correlates the plurality of different platforms to corresponding destinations, and wherein sending, to the destination, information about the first set of the plurality of events further comprises determining the destination based on a platform to which the event records in the first group of event records correspond.

10. The method of claim 1 wherein each device of the plurality of different devices corresponds to a particular geographic region of a plurality of different geographic regions, and wherein each event record in the first group of event records corresponds to a same geographic region.

11. The method of claim 1 wherein the plurality of different devices comprises computing devices, and wherein each event in the first set of the plurality of events is a particular video event that occurred during a video streaming session on a respective computing device, each particular video event being one of a plurality of potential video events.

12. The method of claim 11, wherein each event record received from the plurality of different devices identifies a set of one or more events that is not identified in the normal event set data structure.

13. The method of claim 1, wherein the information about the first set of the plurality of events includes an alert indicating that the first subset of the at least two of the different devices is experiencing a same abnormal set of events.

14. The method of claim 1, wherein the information about the first set of the plurality of events includes contextual information associated with at least one device of the first subset of the at least two of the different devices.

15. The method of claim 14, wherein the contextual information includes at least one characteristic selected from a group of characteristics consisting of an identifier of the at least one device on which the event occurred, a version of the at least one device, an operating system of the at least one device, an approximate time at which an event occurred, and a geographic region associated with the at least one device.

16. A computer system comprising:
one or more computing devices comprising one or more processor devices, the one or more processor devices configured to:
send, to a plurality of different devices on which a plurality of events can occur, a normal event set data structure, the normal event set data structure comprising information that identifies a plurality of different sets of the plurality of events that are deemed normal to identify to the different devices sets of events not to be sent to the computer system;

receive, from the plurality of different devices, a first plurality of event records, each event record identifying one or more events that have occurred on a device of the plurality of different devices, the one or more events comprising only events not identified as normal events in the normal event set data structure;

identify, from the first plurality of event records, a first group of event records that identify a same first set of one or more events that occurred on a first subset of the devices;

determine that a total number of the event records in the first group of event records exceeds a first threshold criterion, wherein the first group of event records are identified by a machine-learning model as an abnormal event set; and in response to determining that the total number of the event records in the first group of event records exceeds the first threshold criterion, send, to a destination, information about the first set of one or more events.

17. The computer system of claim 16 wherein the one or more processor devices are further configured to:

identify, from the first plurality of event records, a second group of event records that identify a same second set of one or more events that occurred on a second subset of the devices, the events identified in the second set of one or more events being different from the events identified in the first set of one or more events;

determine that a total number of the event records in the second group of event records is less than a second threshold criterion; and in response to determining that the total number of the event records in the second group of event records is less than the second threshold criterion, inhibit sending, to the destination, information about the second set of one or more events.

18. The computer system of claim 17 wherein the one or more processor devices are further configured to:

subsequent to receiving the first plurality of event records, receive a second plurality of event records, each event record in the second plurality of event records identifying one or more events that have occurred in a device of the plurality of different devices;

identify, from the second plurality of event records, a third group of event records that identify the same second set of one or more events that occurred on a third subset of the devices;

determine that a total number of the event records in the second group of event records and the third group of event records exceeds the second threshold criterion; and in response to determining that the total number of the event records in the second group of event records and the third group of event records exceeds the second threshold criterion, send, to the destination, information about the second set of one or more events.

19. The computer system of claim 16 wherein the computer system is configured to receive the first plurality of event records from a plurality of different client computing devices, and wherein the one or more processor devices are further configured to:

generate the normal event set data structure, the normal event set data structure comprising the information that identifies the plurality of different sets of events that are deemed normal.

20. A non-transitory computer-readable storage medium that includes executable instructions configured to cause a computer system that comprises one or more computing devices that include one or more processor devices to:

send, to a plurality of different devices on which a plurality of events can occur, a normal event set data structure, the normal event set data structure comprising information that identifies a plurality of different sets of the plurality of events that are deemed normal to identify to the different devices sets of events not to be sent to the computer system;

receive, from the plurality of different devices, a first plurality of event records, each event record identifying one or more events that have occurred on a device of the plurality of different devices, wherein each respective device of the plurality of different devices only sends event records that the respective device determined to be an anomalous event record that identifies an anomalous set of events based on a comparison of each event record to the normal event set data structure;

identify, from the first plurality of event records, a first group of event records that identify a same first set of one or more events that occurred on a first subset of the different devices;

determine that a total number of the event records in the first group of event records exceeds a first threshold criterion; and in response to determining that the total number of the event records in the first group of event records exceeds the first threshold criterion, send, to a destination, information about the first set of one or more events.

21. The non-transitory computer-readable storage medium of claim 20 wherein the instructions further cause the one or more processor devices to:

identify, from the first plurality of event records, a second group of event records that identify a same second set of one or more events that occurred on a second subset of the devices, the events identified in the second set of one or more events being different from the events identified in the first set of one or more events;

determine that a total number of the event records in the second group of event records is less than a second threshold criterion; and in response to determining that the total number of the event records in the second group of event records is less than the second threshold criterion, inhibit sending, to the destination, information about the second set of one or more events.

22. The non-transitory computer-readable storage medium of claim 20 wherein the instructions further cause the one or more processor devices to:

generate the normal event set data structure, the normal event set data structure comprising the information that identifies the plurality of different sets of events that are deemed normal.

* * * * *